United States Patent
Mo (10) Patent No.: US 12,206,962 B2
(45) Date of Patent: Jan. 21, 2025

(54) METHOD AND DEVICE FOR GENERATING VIDEO PREVIEW CONTENT, COMPUTER DEVICE AND STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Wen Mo, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 35 days.

(21) Appl. No.: 18/248,670

(22) PCT Filed: Oct. 13, 2021

(86) PCT No.: PCT/CN2021/123447
§ 371 (c)(1),
(2) Date: Apr. 11, 2023

(87) PCT Pub. No.: WO2022/078363
PCT Pub. Date: Apr. 21, 2022

(65) Prior Publication Data
US 2023/0396861 A1      Dec. 7, 2023

(30) Foreign Application Priority Data

Oct. 13, 2020   (CN) .......................... 202011092575.2

(51) Int. Cl.
*H04N 21/8549* (2011.01)
*G06V 10/74* (2022.01)
(Continued)

(52) U.S. Cl.
CPC ....... *H04N 21/8549* (2013.01); *G06V 10/761* (2022.01); *G06V 20/49* (2022.01); *G06V 20/62* (2022.01)

(58) Field of Classification Search
CPC ......... H04N 21/8549; H04N 21/44008; H04N 21/454; H04N 21/4545; G06V 10/761; G06V 20/49; G06V 20/62; G06V 20/47
(Continued)

(56) References Cited

U.S. PATENT DOCUMENTS

RE45,082 E   *   8/2014   Demos ..................... H04N 5/21
                                                            382/236
9,571,752 B2 *   2/2017   Morita ................. H04N 5/2621
(Continued)

FOREIGN PATENT DOCUMENTS

CN         103546828 A         1/2014
CN         105761263 A         7/2016
(Continued)

OTHER PUBLICATIONS

"First Office Action and English language translation", CN Application No. 202011092575.2, Oct. 27, 2021, 20 pp.
(Continued)

*Primary Examiner* — Helen Shibru
(74) *Attorney, Agent, or Firm* — Myers Bigel, P.A.

(57) ABSTRACT

The present disclosure relates to a method and device for generating video preview content, a computer device and a storage medium. The method for generating video preview content includes parsing a video to be processed, to obtain all image frames of the video to be processed and generate a list of ordered image frames; processing the list of the ordered image frames by image recognition to filter out a
(Continued)

slice header and a slice tail of the video; and generating preview content of the video based on a list of the filtered image frames.

14 Claims, 4 Drawing Sheets

(51) Int. Cl.
*G06V 20/40* (2022.01)
*G06V 20/62* (2022.01)

(58) Field of Classification Search
USPC .......................................................... 386/278
See application file for complete search history.

(56) References Cited

U.S. PATENT DOCUMENTS

| | | | | |
|---|---|---|---|---|
| 10,510,152 | B2* | 12/2019 | Romanik | ............ G06V 10/757 |
| 11,687,714 | B2* | 6/2023 | Aggarwal | ................ G06N 3/08 |
| | | | | 704/9 |
| 2003/0210261 | A1 | 11/2003 | Wu et al. | |
| 2014/0176738 | A1* | 6/2014 | Ip | ....................... H04N 23/6811 |
| | | | | 348/208.2 |
| 2016/0188997 | A1 | 6/2016 | Desnoyer et al. | |
| 2017/0091590 | A1* | 3/2017 | Sawhney | ................ G06F 18/40 |
| 2018/0061459 | A1 | 3/2018 | Song et al. | |
| 2019/0236371 | A1* | 8/2019 | Boonmee | ............ G06V 10/764 |
| 2020/0151460 | A1* | 5/2020 | Korenwaitz | ..... H04N 21/23418 |
| 2023/0315988 | A1* | 10/2023 | Aggarwal | ............ G06F 40/279 |
| | | | | 704/9 |
| 2024/0157959 | A1* | 5/2024 | Jung | ..................... B60W 50/14 |
| 2024/0274156 | A1* | 8/2024 | Tsukagoshi | ............ G06V 20/48 |

FOREIGN PATENT DOCUMENTS

| | | |
|---|---|---|
| CN | 107454454 A | 12/2017 |
| CN | 110166828 A | 8/2019 |
| CN | 110532983 A | 12/2019 |
| CN | 110853124 A | 2/2020 |
| CN | 111523566 A | 8/2020 |
| CN | 112291618 A | 1/2021 |

OTHER PUBLICATIONS

"International Search Report and Written Opinion of the International Searching Authority with English language translation", International Application No. PCT/CN2021/123447, Jan. 5, 2022, 15 pp.

* cited by examiner

Fig. 5

METHOD AND DEVICE FOR GENERATING VIDEO PREVIEW CONTENT, COMPUTER DEVICE AND STORAGE MEDIUM

CROSS-REFERENCE TO RELATED APPLICATIONS

The present application is a U.S. National Stage application under 35 U.S.C. § 371 of International Patent Application No. PCT/CN2021/123447, filed on Oct. 13, 2021, which is based on and claims priority to CN patent application No. 202011092575.2, filed on Oct. 13, 2020, the disclosures of both of which are incorporated by reference herein in their entireties.

TECHNICAL FIELD

The present disclosure relates to the field of project construction, in particular to a method and device for generating video preview content, a computer device and a storage medium.

BACKGROUND

Video content is used more and more widely. At most times, when confronted with a number of video content, a fast way for viewing the video is required. For example, on a video information list page, it is undesirable to apply an entire video for each video item in the list, but rather to use a video clip or an image as preview content. In this case, a method is required to generate a shorter video than the original video or a GIF (Graphics Interchange Format) image based on the original video.

SUMMARY

According to one aspect of the present disclosure, a method for generating video preview content is provided. The method comprises: parsing a video to be processed, to obtain all image frames of the video to be processed and generate a list of ordered image frames; processing the list of the ordered image frames by image recognition to filter out a slice header and a slice tail of the video; and generating preview content of the video based on a list of the filtered image frames.

In some embodiments of the present disclosure, the method for generating video preview content further comprises: calculating a similarity between adjacent image frames based on the list of the ordered image frames; and filtering out a later image frame in the adjacent image frames with a similarity greater than a similarity threshold.

In some embodiments of the present disclosure, the processing the list of the ordered image frames by image recognition to filter out a slice header and a slice tail of the video comprises: performing image recognition on each image frame in the list of the ordered image frames, to determine positions of regions containing text in each image frame; determining whether a proportion of the text is greater than a threshold for each image frame, wherein the proportion of the text is a ratio of the area occupied by all the text to the area of the image frame; and filtering out image frames of the slice header and the slice tail, wherein the proportion of the text in the image frames of the slice header and the slice tail is greater than the threshold.

In some embodiments of the present disclosure, the calculating a similarity between adjacent image frames based on the list of the ordered image frames, and filtering out a later image frame in the adjacent image frames with a similarity greater than a similarity threshold comprises: calculating the similarity between adjacent image frames based on each image frame in the list of the image frames, wherein the adjacent image frames are a current image frame and a next image frame; determining whether there are adjacent image frames with a similarity greater than the similarity threshold; and filtering out a later image frame in the adjacent image frames with the similarity greater than the similarity threshold in the case where there are adjacent image frames with a similarity greater than the similarity threshold, until there are no adjacent image frames with a similarity greater than the similarity threshold in the list of the image frames.

In some embodiments of the present disclosure, the generating preview content of the video based on a list of the filtered image frames comprises: determining a screening number according to a length of the video to be processed and a type of the preview content, wherein the screening number is a number of image frames required by the preview content; determining the screening number of the image frames required by the preview content from the list of the filtered image frames; generating a list of ordered image frames required by the preview content from the image frames required by the preview content; and generating the preview content according to the list of the image frames required by the preview content.

In some embodiments of the present disclosure, the determining the screening number of the image frames required by the preview content from the list of the filtered image frames comprises: calculating a screening weight of each image frame in the list of the filtered image frames according to a similarity between the each image frame and a next image frame of the each image frame; dividing the list of the filtered image frames into a predetermined number of segments, wherein the predetermined number is the screening number, and the sum of the screening weights of all the image frames in one segment is equal to the sum of the screening weights of all the image frames in any one of the other segments; and taking an image frame with a maximum weight value in the segment as the image frame required by the preview content for each segment.

In some embodiments of the present disclosure, the preview content of the video comprises at least one of a graphics interchange format image or a new video.

According to another aspect of the present disclosure, a device for generating video preview content is provided. The device comprises: an image frame list generation module configured to parse a video to be processed, to obtain all image frames of the video to be processed and generate a list of ordered image frames; an image recognition module configured to process the list of the ordered image frames by image recognition to filter out a slice header and a slice tail of the video; and a preview content generation module configured to generate preview content of the video based on a list of the filtered image frames.

In some embodiments of the present disclosure, the device for generating video preview content further comprises: calculate a similarity between adjacent image frames based on the list of the ordered image frames; and filter out a later image frame in the adjacent image frames with a similarity greater than a similarity threshold.

In some embodiments of the present disclosure, the image recognition module is configured to perform image recognition on each image frame in the list of the ordered image frames, to determine positions of regions containing text in each image frame; determine whether a proportion of the text is greater than a threshold for each image frame, wherein the proportion of the text is a ratio of the area occupied by all the text to the area of the image frame; and filter out image frames of the slice header and the slice tail, wherein the proportion of the text in the image frames of the slice header and the slice tail is greater than the threshold.

In some embodiments of the present disclosure, the image similarity calculation module is configured to calculate the similarity between adjacent image frames based on each image frame in the list of the image frames, wherein the adjacent image frames are a current image frame and a next image frame; determine whether there are adjacent image frames with a similarity greater than the similarity threshold; and filter out a later image frame in the adjacent image frames with the similarity greater than the similarity threshold in the case where there are adjacent image frames with a similarity greater than the similarity threshold, until there are no adjacent image frames with a similarity greater than the similarity threshold in the list of the image frames.

In some embodiments of the present disclosure, the preview content generation module is configured to determine a screening number according to a length of the video to be processed and a type of the preview content, wherein the screening number is a number of image frames required by the preview content; determine the screening number of the image frames required by the preview content from the list of the filtered image frames; generate a list of ordered image frames required by the preview content from the image frames required by the preview content; and generate the preview content according to the list of the image frames required by the preview content.

In some embodiments of the present disclosure, the preview content generation module is configured to calculate a screening weight of each image frame in the list of the filtered image frames according to a similarity between the each image frame and a next image frame of the each image frame; divide the list of the filtered image frames into a predetermined number of segments, wherein the predetermined number is the screening number, and the sum of the screening weights of all the image frames in one segment is equal to the sum of the screening weights of all the image frames in any one of the other segments; and take an image frame with a maximum weight value in the segment as the image frame required by the preview content for each segment, in the case wherein the screening number of the image frames required by the preview content are determined from the list of the filtered image frames.

In some embodiments of the present disclosure, the video preview content of the video comprises at least one of a graphics interchange format image or a new video.

According to another aspect of the present disclosure, a computer device is provided. The device comprises: a memory for storing instructions; and a processor for executing the instructions, so that the computer device performs operations of implementing the method for generating video preview content according to any one of the above-described embodiments.

According to another aspect of the present disclosure, a non-transitory computer readable storage medium is provided, wherein the computer readable storage medium stores computer instructions that, when executed by a processor, implement the method for generating video preview content according to any one of the above-described embodiments.

BRIEF DESCRIPTION OF THE ACCOMPANYING DRAWINGS

In order to more explicitly explain the embodiments of the present disclosure or the technical solutions in the related art, the accompanying drawings required to be used in the description of the embodiments or the related art will be briefly introduced below. It is apparent that, the accompanying drawings illustrated below are merely some of the embodiments of the present disclosure. For those of ordinary skill in the art, other accompanying drawings may also be obtained according to these accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present disclosure.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors have found through studies that, in the related art, some image frames are extracted from the video and compressed into a GIF image. For example, the method in the related art comprises: extracting a plurality of image frames of a video file, adding the extracted plurality of image frames into a thumbnail image set, and generating a dynamic thumbnail according to the image frames in the thumbnail image set.

However, the quality of the previewed image generated in the related art is not good enough, and if it is desirable to generate a previewed image with high quality, manual intervention might be required. For example, in the method of the related art, it is impossible to discern the header and tail text content of the video or perceive a rapid change of the video content (for example, most of the contents in the surveillance video are identical, and the changed parts need to be intercepted).

In view of at least one of the above technical problems, the present disclosure provides a method and device for generating video preview content, a computer device, and a storage medium, which will be described below by way of specific embodiments.

Figure 1:
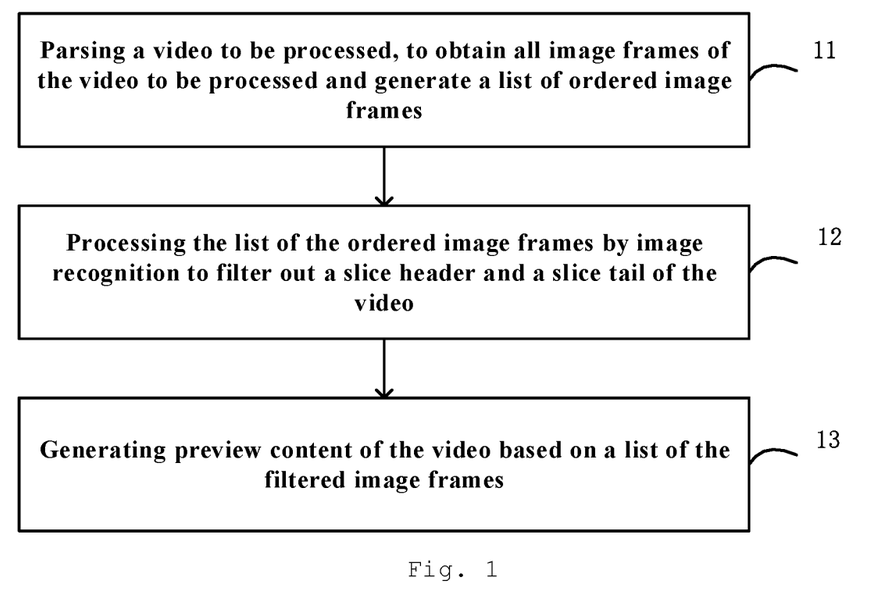
FIG. 1 is a schematic view of a method for generating video preview content according to some embodiments of the present disclosure.

FIG. 1 is a schematic view of a method for making video preview content according to some embodiments of the present disclosure. Preferably, the present embodiment may be implemented by a device for generating video preview content or a computer device of the present disclosure. The method may comprise at least one of steps 11 to 13.

In Step 11, the video content to be processed is parsed to obtain all image frames of the video to be processed and generate a list of ordered image frames.

In some embodiments of the present disclosure, the step 11 may comprise: reading the content of the video file to be processed, extracting all the video frame image information in the video file, and obtaining a list of ordered image frames according to a time sequence of the video.

In Step 12, the list of the ordered image frames is processed by image recognition to filter out a slice header and a slice tail of the video.

In some embodiments of the present disclosure, the step 12 may comprise at least one of steps 121 to 123.

In Step 121, the positions of regions containing text in each image frame are determined by performing image recognition on each image frame in the list of the ordered image frames.

In Step 122, for each image, it is determined whether a proportion of the text is greater than a threshold for each image frame, wherein the proportion of the text is a ratio of the area occupied by all the text to the area of the image frame.

In Step 123, image frames of the slice header and the slice tail are filtered out, wherein the proportion of the text in the image frames of the slice header and the slice tail is greater than the threshold.

In Step 13, preview content of the video to be processed is generated based on the list of the filtered image frames. In some embodiments of the present disclosure, the video preview content may be at least one of a GIF image or a new video.

Based on the method for generating video preview content provided in the above-described embodiments of the present disclosure, it is possible to improve the quality of the preview content generated based on the video, and to ignore the header and tail content of the video. In the above-described embodiments of the present disclosure, core images are screened by image recognition to generate a GIF image or a new video.

Figure 2:
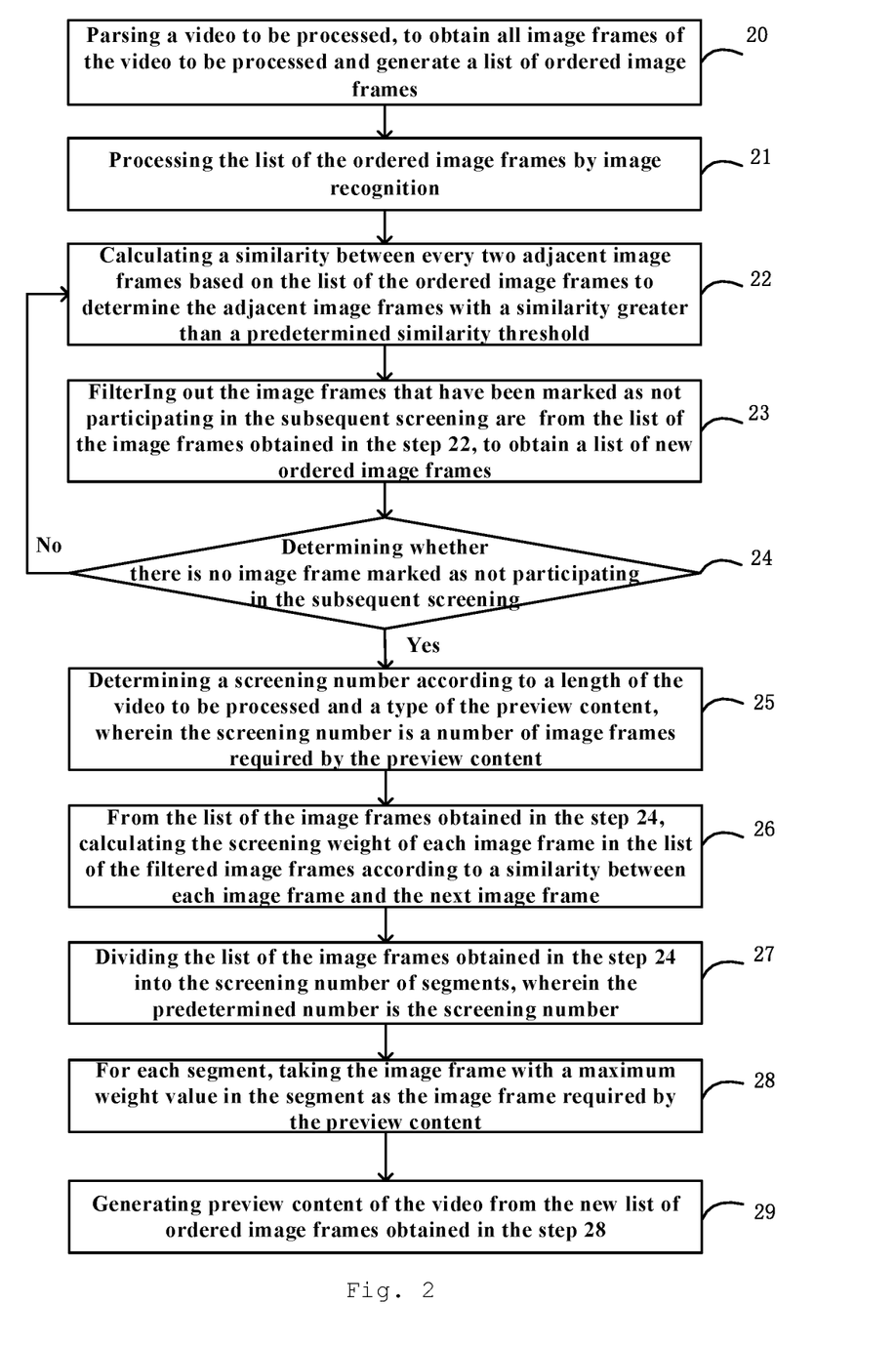
FIG. 2 is a schematic view of a method for generating video preview content according to other embodiments of the present disclosure.

FIG. 2 is a schematic view of a method for making video preview content according to other embodiments of the present disclosure. Preferably, the present embodiment may be implemented by a device for generating video preview content or a computer device of the present disclosure. The method may comprise at least one of steps 20 to 29.

In Step 20: the video content to be processed is parsed to obtain all image frames of the video to be processed and generate a list of ordered image frames.

In some embodiments of the present disclosure, the step 20 may comprise: reading the content of the video file to be processed, extracting all the video frame image information in the video file, and obtaining a list of ordered image frames according to a time sequence of the video.

In Step 21, the list of the ordered image frames is processed by image recognition.

In some embodiments of the present disclosure, the step 21 may comprise: a cycle of the following steps 211 to 216 for the list of the ordered image frames obtained in the step 20.

In Step 211, the positions of regions containing text in a current image frame are obtained by performing picture recognition on the current image frame (picture).

In some embodiments of the present disclosure, the step 211 may comprise: extracting a plurality of image regions containing text from the current image frame.

In Step 212, the areas occupied by all the text are calculated and then summed.

In Step 213, the ratio of the area occupied by the text to the current image frame area is calculated.

In Step 214, it is checked whether the ratio is greater than a predetermined threshold.

In some embodiments of the present disclosure, the predetermined threshold may be configured, for example, the predetermined threshold may be configured to be 10%.

In Step 215, if the ratio is greater than the predetermined threshold, the current image frame is marked as not participating in the subsequent image screening.

In Step 216, it is checked whether there is a next image behind the current image. If yes, the cycle continues by taking the next image as the current image, and then the step 211 is executed. If no, step 22 is executed.

In Step 22, a similarity between every two adjacent image frames is calculated based on the list of the ordered image frames to determine the adjacent image frames with a similarity greater than a predetermined similarity threshold.

In some embodiments of the present disclosure, the step 22 may comprise: performing the following cycle on the list of the ordered image frames obtained in the step 21, the following cycle at least comprise the following steps 221 to 225.

In Step 221, a current image frame and a next image frame are obtained for similarity calculation to obtain a similarity ratio.

In some embodiments of the present disclosure, the step 221 may comprise: taking the current image frame and the next image frame as a reference image and a query image respectively; partitioning the reference image and the query image into small regions; extracting a feature quantity of each small region from the partitioned small region as a feature quantity of the small region of the query image and the reference image; comparing the feature quantity of the small region of the reference image with the feature quantity of the small region of the query image; calculating the similarity of the feature quantity of each small region as the similarity of the small region; and calculating the image similarity between the query image and the reference image by weighting the similarity of the small region with the weight value based on the small region and obtained from the weight value of a local region.

In Step 222, it is checked whether a similarity between the two image frames is greater than the similarity threshold.

In some embodiments of the present disclosure, the similarity threshold may be configured, for example, the similarity threshold may be configured to be 50%.

In Step 223, the condition is if a similarity between the two images is greater than the similarity threshold.

In Step 224: the next image frame of the current image frame is marked as not participating in the subsequent image screening.

In Step 225, it is checked whether there is still a next image frame for the current image frame. If yes, the cycle continues with the next image frame as the current image frame, and then step 221 is executed; if not, step 23 is executed.

In Step 23, the image frames that have been marked as not participating in the subsequent screening are filtered out from the list of the image frames obtained in the step 22, to obtain a list of new ordered image frames.

In Step 24, the list of the new ordered image frames obtained in the step 23 are repeated in the manner of step 22 and step 23 to filter out the image frames that do not participate in the screening until there is no image frame marked as not participating in the subsequent screening in the step 23.

In Step 25, a screening number is determined according to a length of the video to be processed and a type of the preview content, wherein the screening number is a number of image frames required by the preview content.

In some embodiments of the present disclosure, the screening number may be a configuration list.

In some embodiments of the present disclosure, the step 25 may comprise: performing stepped configuration on the number of pictures (image frames) required to be generated finally, according to the video length, for example, taking 5 image frames for a video of 1 minute, 10 image frames for a video of 1 to 5 minutes, 15 image frames for a video of 5 to 20 minutes, and 30 image frames for a video of 20 to 30 minutes or a video of 30 or more minutes; the number of image frames may be more if a new video is required to be generated finally.

In Step 26, from the list of the filtered image frames obtained in the step 24, the screening weight of each image frame in the list of the filtered image frames is calculated according to a similarity between each image frame and the next image frame of the each image frame.

In some embodiments of the present disclosure, the step 26 may comprise at least one of steps 261 to 263.

In Step 261, the screening weight of each image frame in the list ordered image frames obtained in the step 24 is calculated by using the similarity ratio of each image frame to the next image frame.

In some embodiments of the present disclosure, the step 261 may comprise: calculating the screening weight of each image frame according to the formula (1).

$$\text{Screening weight} = 1/(\text{similarity ratio}*100) \quad (1)$$

In Step 262, the screening weights of each image frame are added for summation to obtain a total weight.

In Step 263, the weight position of each image is calculated by the algorithm as follows: all the weights in front of the position of each image frame are added to obtain the weight position of this image frame.

In Step 27, the list of the image frames obtained in the step 24 is divided into a predetermined number of segments, wherein the predetermined number is the screening number, and the sum of the screening weights of all the image frames in one segment is equal to the sum of the screening weights of all the image frames in any one of the other segments.

In some embodiments of the present disclosure, the step 27 may comprise at least one of steps 271 to 272.

In Step 271, average segmentation is performed between 0 and total weight according to the number of image frames required by the preview content obtained in the step 25.

In Step 272, the list of the ordered image frames is then also divided into the same segments according to a weight range of each segment.

In Step 28, for each segment, the image frame with a maximum weight value in the segment is taken as the image frame required by the preview content.

In some embodiments of the present disclosure, the step 28 may comprise: performing a cycle of step 281 and step 282 from the segments of ordered image frames obtained in the step 27.

In Step 281, the image with a maximum weight value in the current segment is retrieved so that this image is screened out and placed in a new list of ordered image frames in sequence and first in front.

In Step 282, it is determined whether there is a next segment of ordered image frames. If yes, the step 281 is repeated; if no, the step 29 is performed.

In Step 29: preview content of the video is generated from the new list of ordered image frames obtained in the step 28.

In some embodiments of the present disclosure, the video preview content may comprise at least one of a GIF image or a new video.

In some embodiments of the present disclosure, the step 29 may comprise at least one of steps 291 to 293.

In Step 291, it is determined which form of content is required to be generated finally from the new list of ordered image frames obtained in the step 28.

In Step 292, if a GIF image is determined to generate, the image frames call a GIF image generating module to generate a GIF image frames based on the new list of ordered image frames.

In some embodiments of the present disclosure, the step 292 may comprise: obtaining a single image material for generating a GIF image; generating an animation according to the single image material; extracting all frame images of the animation; and rendering a GIF image according to all frame images of the animation.

In Step 293, if a video is determined to generate, a new list of the image frames is formed from the list of the image frames obtained in the step 28, by removing the audio content, to regenerate a new video.

In the above-described embodiments of the present disclosure, it is possible to screen core images by image recognition and image similarity to generate a GIF image or a new video. In the above-described embodiments of that present disclosure, it is possible to improve the quality of the preview content generated based on the video, and ignore the header and tail text content of the video and a large segment of resembling video content.

In the above-described embodiments of the present disclosure, it is possible to discern the header and tail text content of the video, and perceive a rapid change of the video content.

In the above-described embodiments of the present disclosure, it is possible to realize a quick preview of the video file, so that the user may know the main information of the video file in a short time, thereby improving the user experience.

Figure 3:
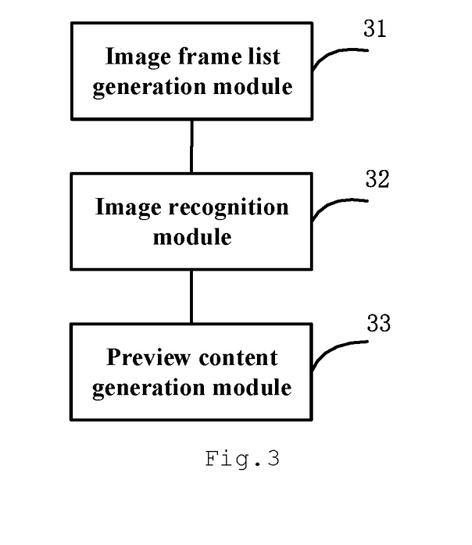
FIG. 3 is a schematic view of a device for generating video preview content according to some embodiments of the present disclosure.

FIG. 3 is a schematic view of a device for making video preview content according to some embodiments of the present disclosure. As shown in FIG. 3, the device for generating video preview content according to the present disclosure comprises an image frame list generation module 31, an image recognition module 32 and a preview content generation module 33.

The list of the image frames generation module 31 is configured to parse a video to be processed, to obtain all image frames of the video to be processed and generate a list of ordered image frames.

In some embodiments of the present disclosure, the image frame list generation module 31 may be configured to read the content of the video file to be processed, extract all the video frame image information in the video file, and obtain a list of ordered image frames according to a time sequence of the video.

The image recognition module 32 is configured to process the list of the ordered image frames by image recognition to filter out a slice header and a slice tail of the video.

In some embodiments of the present disclosure, the image recognition module 32 may be configured to perform image recognition on each image frame in the list of the ordered image frames, to determine positions of regions containing text in each image frame; determine whether a proportion of the text is greater than a threshold for each image frame, wherein the proportion of the text is a ratio of the area occupied by all the text to the area of the image frame; and filter out image frames of the slice header and the slice tail, wherein the proportion of the text in the image frames of the slice header and the slice tail is greater than the threshold.

The preview content generation module 33 is configured to generate preview content of the video based on a list of the filtered image frames.

In some embodiments of the present disclosure, the video preview content may comprise at least one of a graphics interchange format image or a new video.

In the device for generating video preview content based on the above-described embodiments of the present disclosure, it is possible to improve the quality of the preview content generated based on the video, and ignore the header and tail content of the video. In the above-described embodiments of the present disclosure, the core images are screened by image recognition to generate a GIF image or a new video.

Figure 4:
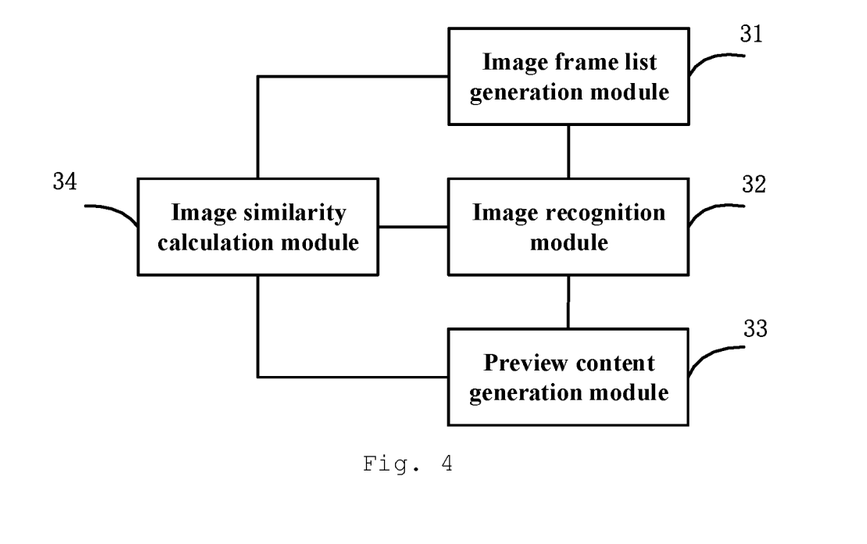
FIG. 4 is a schematic view of a device for generating video preview content according to other embodiments of the present disclosure.

FIG. 4 is a schematic view of a device for making video preview content according to other embodiments of the present disclosure. Compared with the embodiment of FIG. 3, the device for generating video preview content according to the present disclosure in the embodiment of FIG. 4 may further comprise an image similarity calculation module 34.

The image similarity calculation module 34 is configured to calculate a similarity between adjacent image frames based on the list of the ordered image frames; and filter out filter out a later image frame in the adjacent image frames with a similarity greater than a similarity threshold, and then instruct the preview content generation module 33 to perform operation of generating video preview content based on the list of the filtered image frames.

In some embodiments of the present disclosure, the image similarity calculation module 34 may be configured to calculate the similarity between adjacent image frames based on each image frame in the list of the image frames, wherein the adjacent image frames are a current image frame and a next image frame; determine whether there are adjacent image frames with a similarity greater than the similarity threshold; filter out a later image frame in the adjacent image frames with the similarity greater than the similarity threshold in the case where there are adjacent image frames with a similarity greater than the similarity threshold; perform operation of calculating a similarity between adjacent image frames based on each image frame in the list of the image frames for the current list of the image frames; and instruct the preview content generation module 33 to perform operation of generating preview content of the video based on the list of the filtered image frames in the case where there are no adjacent image frames with a similarity greater than a predetermined similarity threshold.

In some embodiments of the present disclosure, the preview content generation module 33 may be configured to determine a screening number according to a length of the video to be processed and a type of the preview content, wherein the screening number is a number of image frames required by the preview content; determine the screening number of the image frames required by the preview content from the list of the filtered image frames; generate a list of ordered image frames required by the preview content from the image frames required by the preview content; and generate the preview content according to the list of the image frames required by the preview content.

In some embodiments of the present disclosure, the preview content generation module 33 may be configured to calculate a screening weight of each image frame in the list of the filtered image frames according to a similarity between the each image frame and a next image frame of the each image frame; divide the list of the filtered image frames into a predetermined number of segments, wherein the predetermined number is the screening number, and the sum of the screening weights of all the image frames in one segment is equal to the sum of the screening weights of all the image frames in any one of the other segments; and take an image frame with a maximum weight value in the segment as the image frame required by the preview content for each segment, in the case wherein the screening number of the image frames required by the preview content are determined from the list of the filtered image frames.

In some embodiments of the present disclosure, the device for generating video preview content is configured to perform operations to implement the method for generating video preview content according to any of the above-described embodiments (for example, the embodiment of FIG. 1 or FIG. 2).

In the above-described embodiments of the present disclosure, it is possible to discern the header and tail text content of the video, and perceive a rapid change of the video content.

In the above-described embodiments of the present disclosure, it is possible to realize a quick preview of the video file, so that the user may know the main information of the video file in a short time, thereby improving the user experience.

Figure 5:
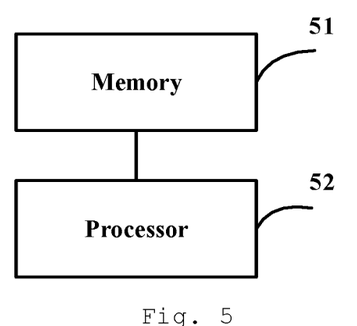
FIG. 5 is a schematic view of a computer device according to some embodiments of the present disclosure.

FIG. 5 is a schematic view of a computer device according to some embodiments of the present disclosure. As shown in FIG. 5, the computer device according to the present disclosure comprises a memory 51 and a processor 52.

The memory 51 is configured to store instructions.

The processor 52 is configured to execute the instructions, so that the computer device performs operations to implement the method for generating video preview content according to any of the above-described embodiments (for example, the embodiment of FIG. 1 or FIG. 2).

In the above-described embodiments of the present disclosure, it is possible to screen core images by image recognition and image similarity to generate a GIF image or a new video. In the above-described embodiments of that present disclosure, it is possible to improve the quality of the preview content generated based on the video, and ignore the header and tail text content of the video and a large segment of resembling video content.

According to another aspect of the present disclosure, a non-transitory computer-readable storage medium is provided, wherein the computer-readable storage medium having computer instructions stored thereon that, when executed by a processor, implement the method for generating video preview content according to any of the above-described embodiments (for example, the embodiment of FIG. 1 or FIG. 2).

Based on the non-transitory computer-readable storage medium provided by the above-described embodiments of the present disclosure, the core images may be screened by image recognition and image similarity to generate a GIF image or a new video. In the above-described embodiments of that present disclosure, it is possible to improve the quality of the preview content generated based on the video, and ignore the header and tail text content of the video and a large segment of resembling video content.

In the above-described embodiments of the present disclosure, it is possible to discern the header and tail text content of the video, and perceive a rapid change of the video content.

In the above-described embodiments of the present disclosure, it is possible to realize a quick preview of the video file, so that the user may know the main information of the video file in a short time, thereby improving the user experience.

The device for generating video preview content described above may be implemented as a general processor, a programmable logic controller (PLC), a digital signal processor (DSP), an application specific integrated circuit (ASIC), a field programmable gate array (FPGA) or other programmable logic devices, a discrete gate or a transistor logic device, a discrete hardware component or any suitable combination thereof.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure to design various embodiments adapted to particular purposes and comprising various modifications.

What is claimed is:

1. A method for generating video preview content, comprising:
   parsing a video to be processed, to obtain all image frames of the video to be processed and generate a list of ordered image frames;
   processing the list of the ordered image frames by image recognition to filter out a slice header and a slice tail of the video, comprising:
   performing image recognition on each image frame in the list of the ordered image frames, to determine positions of regions containing text in each image frame, determining whether a proportion of the text is greater than a threshold for each image frame, wherein the proportion of the text is a ratio of the area occupied by all the text to the area of the image frame, and filtering out image frames of the slice header and the slice tail, wherein the proportion of the text in the image frames of the slice header and the slice tail is greater than the threshold;
   calculating a similarity between adjacent image frames based on the list of the ordered image frames;
   filtering out a later image frame in the adjacent image frames with a similarity greater than a similarity threshold; and
   generating preview content of the video based on a list of the filtered image frames.

2. The method for generating video preview content according to claim 1, wherein the calculating a similarity between adjacent image frames based on the list of the ordered image frames, and filtering out a later image frame in the adjacent image frames with a similarity greater than a similarity threshold comprises:
   calculating the similarity between adjacent image frames based on each image frame in the list of the image frames, wherein the adjacent image frames are a current image frame and a next image frame;
   determining whether there are adjacent image frames with a similarity greater than the similarity threshold; and
   filtering out a later image frame in the adjacent image frames with the similarity greater than the similarity threshold in the case where there are adjacent image frames with a similarity greater than the similarity threshold, until there are no adjacent image frames with a similarity greater than the similarity threshold in the list of the image frames.

3. The method for generating video preview content according to claim 1, wherein the generating preview content of the video based on a list of the filtered image frames comprises:
   determining a screening number according to a length of the video to be processed and a type of the preview content, wherein the screening number is a number of image frames required by the preview content;
   determining the screening number of the image frames required by the preview content from the list of the filtered image frames;
   generating a list of ordered image frames required by the preview content from the image frames required by the preview content; and
   generating the preview content according to the list of the image frames required by the preview content.

4. The method for generating video preview content according to claim 3, wherein the determining the screening number of the image frames required by the preview content from the list of the filtered image frames comprises:
   calculating a screening weight of each image frame in the list of the filtered image frames according to a similarity between the each image frame and a next image frame of the each image frame;
   dividing the list of the filtered image frames into a predetermined number of segments, wherein the predetermined number is the screening number, and the sum of the screening weights of all the image frames in one segment is equal to the sum of the screening weights of all the image frames in any one of the other segments; and taking an image frame with a maximum weight value in the segment as the image frame required by the preview content for each segment.

5. The method for generating video preview content according to claim 1, wherein the preview content of the video comprises at least one of a graphics interchange format image or a new video.

6. A computer device comprising:
a memory for storing instructions; and
a processor for executing the instructions, so that the computer device performs operations of implementing a method for generating video preview content comprising:
parsing a video to be processed, to obtain all image frames of the video to be processed and generate a list of ordered image frames;
processing the list of the ordered image frames by image recognition to filter out a slice header and a slice tail of the video, comprising:
performing image recognition on each image frame in the list of the ordered image frames, to determine positions of regions containing text in each image frame, determining whether a proportion of the text is greater than a threshold for each image frame, wherein the proportion of the text is a ratio of the area occupied by all the text to the area of the image frame, and filtering out image frames of the slice header and the slice tail, wherein the proportion of the text in the image frames of the slice header and the slice tail is greater than the threshold;
calculating a similarity between adjacent image frames based on the list of the ordered image frames;
filtering out a later image frame in the adjacent image frames with a similarity greater than a similarity threshold; and
generating preview content of the video based on a list of the filtered image frames.

7. A non-transitory computer-readable storage medium, wherein the computer-readable storage medium having computer instructions stored thereon that, when executed by a processor, implement a method for generating video preview content comprising:
parsing a video to be processed, to obtain all image frames of the video to be processed and generate a list of ordered image frames;
processing the list of the ordered image frames by image recognition to filter out a slice header and a slice tail of the video, comprising:
performing image recognition on each image frame in the list of the ordered image frames, to determine positions of regions containing text in each image frame, determining whether a proportion of the text is greater than a threshold for each image frame, wherein the proportion of the text is a ratio of the area occupied by all the text to the area of the image frame, and filtering out image frames of the slice header and the slice tail, wherein the proportion of the text in the image frames of the slice header and the slice tail is greater than the threshold;
calculating a similarity between adjacent image frames based on the list of the ordered image frames;
filtering out a later image frame in the adjacent image frames with a similarity greater than a similarity threshold; and
generating preview content of the video based on a list of the filtered image frames.

8. The computer device according to claim 6, wherein the calculating a similarity between adjacent image frames based on the list of the ordered image frames, and filtering out a later image frame in the adjacent image frames with a similarity greater than a similarity threshold comprises:
calculating the similarity between adjacent image frames based on each image frame in the list of the image frames, wherein the adjacent image frames are a current image frame and a next image frame;
determining whether there are adjacent image frames with a similarity greater than the similarity threshold; and
filtering out a later image frame in the adjacent image frames with the similarity greater than the similarity threshold in the case where there are adjacent image frames with a similarity greater than the similarity threshold, until there are no adjacent image frames with a similarity greater than the similarity threshold in the list of the image frames.

9. The computer device according to claim 6, wherein the generating preview content of the video based on a list of the filtered image frames comprises:
determining a screening number according to a length of the video to be processed and a type of the preview content, wherein the screening number is a number of image frames required by the preview content;
determining the screening number of the image frames required by the preview content from the list of the filtered image frames;
generating a list of ordered image frames required by the preview content from the image frames required by the preview content; and
generating the preview content according to the list of the image frames required by the preview content.

10. The computer device according to claim 9, wherein the determining the determining the screening number of the image frames required by the preview content from the list of the filtered image frames comprises:
calculating a screening weight of each image frame in the list of the filtered image frames according to a similarity between the each image frame and a next image frame of the each image frame;
dividing the list of the filtered image frames into a predetermined number of segments, wherein the predetermined number is the screening number, and the sum of the screening weights of all the image frames in one segment is equal to the sum of the screening weights of all the image frames in any one of the other segments; and
taking an image frame with a maximum weight value in the segment as the image frame required by the preview content for each segment.

11. The computer device according to claim 6, wherein the preview content of the video comprises at least one of a graphics interchange format image or a new video.

12. The non-transitory computer-readable storage medium according to claim 7, wherein the calculating a similarity between adjacent image frames based on the list of the ordered image frames, and filtering out a later image frame in the adjacent image frames with a similarity greater than a similarity threshold comprises:
calculating the similarity between adjacent image frames based on each image frame in the list of the image frames, wherein the adjacent image frames are a current image frame and a next image frame;

determining whether there are adjacent image frames with a similarity greater than the similarity threshold; and filtering out a later image frame in the adjacent image frames with the similarity greater than the similarity threshold in the case where there are adjacent image frames with a similarity greater than the similarity threshold, until there are no adjacent image frames with a similarity greater than the similarity threshold in the list of the image frames.

13. The non-transitory computer-readable storage medium according to claim 7, wherein the generating preview content of the video based on a list of the filtered image frames comprises:

determining a screening number according to a length of the video to be processed and a type of the preview content, wherein the screening number is a number of image frames required by the preview content;

determining the screening number of the image frames required by the preview content from the list of the filtered image frames;

generating a list of ordered image frames required by the preview content from the image frames required by the preview content; and generating the preview content according to the list of the image frames required by the preview content.

14. The non-transitory computer-readable storage medium according to claim 13, wherein the determining the screening number of the image frames required by the preview content from the list of the filtered image frames comprises:

calculating a screening weight of each image frame in the list of the filtered image frames according to a similarity between the each image frame and a next image frame of the each image frame;

dividing the list of the filtered image frames into a predetermined number of segments, wherein the predetermined number is the screening number, and the sum of the screening weights of all the image frames in one segment is equal to the sum of the screening weights of all the image frames in any one of the other segments; and taking an image frame with a maximum weight value in the segment as the image frame required by the preview content for each segment.

\* \* \* \* \*